US011505486B2

(12) United States Patent
Swiler

(10) Patent No.: US 11,505,486 B2
(45) Date of Patent: Nov. 22, 2022

(54) VERIFIABLE BUBBLER

(71) Applicant: Owens-Brockway Glass Container Inc., Perrysburg, OH (US)

(72) Inventor: Daniel R. Swiler, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 542 days.

(21) Appl. No.: 16/596,482

(22) Filed: Oct. 8, 2019

(65) Prior Publication Data

US 2021/0101817 A1   Apr. 8, 2021

(51) Int. Cl.
| C03B 5/193 | (2006.01) |
| G01K 7/02 | (2021.01) |
| G01K 13/02 | (2021.01) |
| G01K 13/024 | (2021.01) |

(52) U.S. Cl.
CPC ............... *C03B 5/193* (2013.01); *G01K 7/02* (2013.01); *G01K 13/02* (2013.01); *G01K 13/024* (2021.01)

(58) Field of Classification Search
USPC ................................ 374/139, 208, 179, 141
See application file for complete search history.

(56) References Cited

U.S. PATENT DOCUMENTS

| 3,239,324 A | 3/1966 | Monks, Jr. et al. |
| 3,397,973 A | 8/1968 | Rough |
| 3,482,956 A * | 12/1969 | Trethewey ............... C03B 5/245 |
| | | 73/302 |
| 4,919,699 A | 4/1990 | Matsukawa et al. |
| 6,334,337 B1 | 1/2002 | de Macedo et al. |
| 7,225,643 B1 | 6/2007 | Guerrero et al. |
| 2002/0121113 A1 | 9/2002 | Gohlke et al. |
| 2010/0207306 A1* | 8/2010 | Kendall ................ F27D 3/1536 |
| | | 374/E7.004 |

(Continued)

FOREIGN PATENT DOCUMENTS

| CN | 86209007 U | 10/1987 |
| CN | 2793069 Y | 7/2006 |
| CN | 102050561 | 5/2011 |

(Continued)

OTHER PUBLICATIONS

Int. Search Report and Written Opinion, Int. Application No. PCT/US2020/053414, Int. Filing Date: Sep. 30, 2020, Applicant: Owens-Brockway Glass Container Inc., dated Feb. 1, 2021.

*Primary Examiner* — Mirellys Jagan

(57) ABSTRACT

A bubbler device and method of its operation are disclosed. The bubbler device includes a bubbler tube that provides bubbles to a molten material in a furnace; a protective layer disposed on the bubbler tube; and a wire that is electrically coupled to the protective layer. The wire extends through the bore, and the protective layer and the wire partially form an electrical circuit for measuring integrity of the bubbler device based on at least one of conductivity or resistance in the electrical circuit. Sometimes, an inner protective material may be disposed on an inside surface of the tube and coupled to the protective layer, and the wire can be coupled to the inner protective material or multiple wires may be used. The use of dissimilar materials in these components may be used to form a thermocouple junction to measure the temperature of the molten material in a furnace.

21 Claims, 6 Drawing Sheets

(56) References Cited

U.S. PATENT DOCUMENTS

2011/0011134 A1    1/2011  Richardson

FOREIGN PATENT DOCUMENTS

| CN | 103570218 | | 2/2014 | | |
|---|---|---|---|---|---|
| CN | 107010815 | A | 8/2017 | | |
| CN | 108885140 | A * | 11/2018 | ............ | C03B 5/167 |
| JP | S6430330 | U | 2/1989 | | |
| KR | 20030069778 | | 8/2003 | | |
| SU | 508489 | | 3/1976 | | |

* cited by examiner

VERIFIABLE BUBBLER

This patent application discloses a device and methods of glass manufacturing, and more particularly, devices and methods to melt glassmaking materials into molten glass.

BACKGROUND

During glass manufacturing, bubblers are sacrificial components that extend through a floor of a furnace for melting glassmaking raw materials into molten glass. As their name implies, the bubblers introduce or bubble gases into the molten glass in order to assist in mixing of the molten glass. The bubblers are either cooled, periodically replaced, or clad with materials, such as platinum, that can withstand the harsh environment of the furnace in order to extend their useful lifetime.

However, even when clad with these materials, the bubblers can fail earlier than expected and/or require frequent adjustment and/or replacement. For example, if there is a significant amount of metal contamination in the molten glass, such metal can alloy with the platinum, leaving the platinum cladding less refractory and weakened. When a bubbler fails and is not adjusted or replaced, the agitation of the glass by bubbles from such broken bubbler may cause rapid corrosion of the furnace refractory brick floor near the location of the bubbler, thereby causing a glass leak in the adjacent floor that can cause a failure of the entire furnace, not simply the bubbler itself.

BRIEF SUMMARY OF THE DISCLOSURE

The present disclosure embodies a number of aspects that can be implemented separately from or in combination with each other.

In accordance with one aspect of the disclosure, there is a bubbler device that includes a bubbler tube including an internal bore that provides bubbles to a molten material in a furnace; a protective layer disposed on an outside surface of the bubbler tube; and a first wire that is electrically coupled to the protective layer, wherein the first wire extends through at least a portion of the bore, and wherein the protective layer and the first wire form a first electrical circuit for measuring integrity of the bubbler device based on at least one of conductivity or resistance in the electrical circuit or temperature of the molten material by a thermoelectric effect of the circuit. In some instances, an inner protective material may be disposed on an inside surface of the tube and coupled to the protective layer, and the first wire can be coupled to the inner protective material as part of the electric circuit. In some instances, the bubbler device may include a second wire and multiple thermocouples.

In accordance with another aspect of the disclosure, there is provided a method of operating a bubbler device with a bubbler tube as described herein. The method can comprise monitoring electrical conductivity or resistivity of at least one electrical circuit of the bubbler device, the bubbler device comprising: a bubbler tube including an internal bore that provides bubbles to a molten material in a furnace; a protective layer disposed on an outside surface of the bubbler tube; and at least one wire that is electrically coupled to the protective layer, wherein the at least one wire extends through at least a portion of the bore, and wherein the protective layer and the at least one wire partially form at least one electrical circuit for monitoring integrity of the bubbler device based on at least one of conductivity or resistivity in the electrical circuit, or temperature of the molten material.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1A:
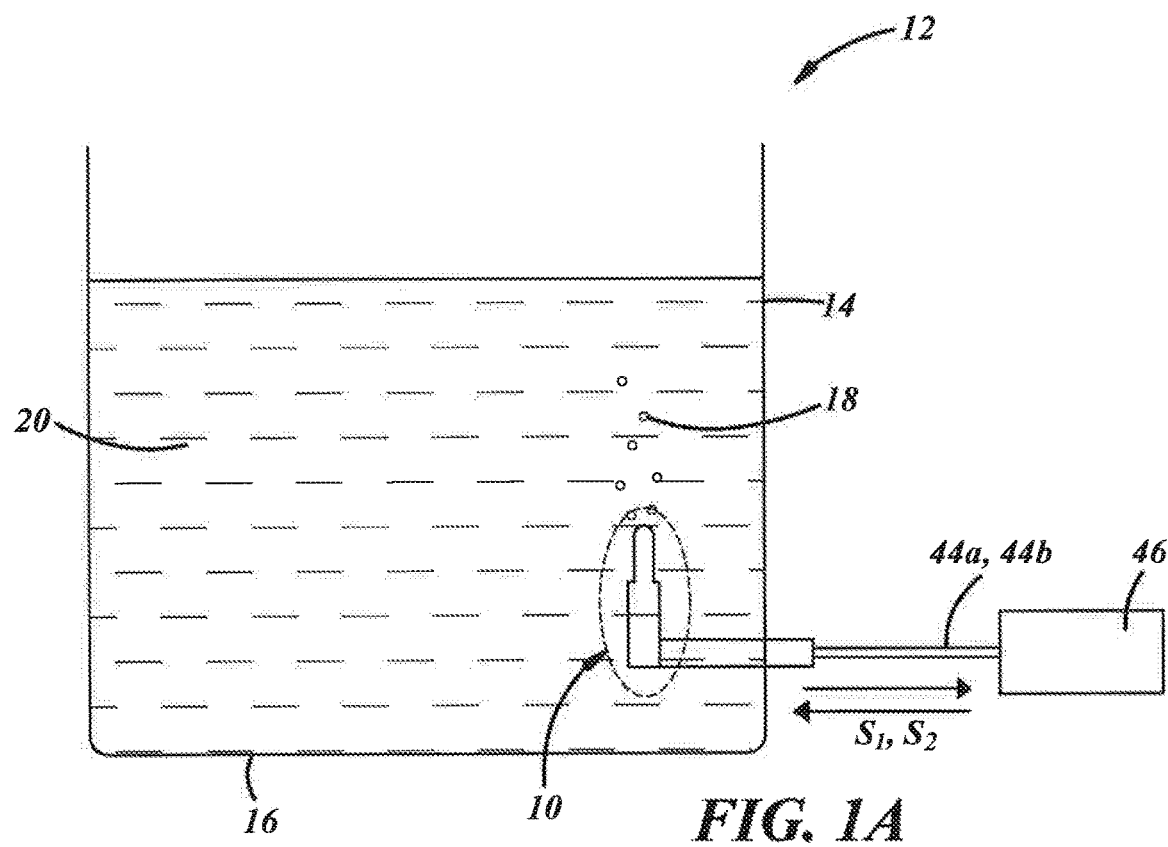
FIG. 1A is a schematic cross-sectional view of a glass manufacturing furnace having a bubbler device that extends through a sidewall of the furnace in accordance with an illustrative embodiment of the present disclosure.

In accordance with at least one aspect of the disclosure, a bubbler is provided that can be monitored to verify integrity of the bubbler. For example, if the monitored integrity is good, the bubbler device will likely be functioning properly. If the monitored integrity of the bubbler device is poor, then the bubbler device is likely malfunctioning and should be maintained or replaced.

As briefly discussed in the Background, glass manufacturing furnaces melt glassmaking materials into molten glass. They can include bubblers that introduce various gases, typically air, into a furnace to facilitate mixing of the molten glass. While some bubblers can last up to eight years or more in the furnace, harsh environmental conditions (e.g., high temperatures and extreme temperature changes) in the furnace can lead to rapid bubbler failure, for example, within four years. Even before a total bubbler failure, the bubblers often may need maintenance and repositioning in order to continue functioning properly.

In addition to the unpredictability of when a bubbler will fail, it is often difficult to determine if a bubbler currently in use is already malfunctioning. The bubblers are generally positioned within the molten glass and may not be easy to access. If a bubbler is malfunctioning for a period of time, it can lead to a molten glass leak developing at a location of the bubbler, which, if left unattended, can cause a failure of the entire furnace. The leak can release the molten material through the floor of the furnace and below, potentially damaging various components in and around the furnace and leaking the molten material.

In order to solve the problems of early bubbler failure and the difficulty of determining when a bubbler is already malfunctioning, one solution is to provide a bubbler that can be readily, automatically or manually, verified to see if it is intact and functioning properly. Integrity of the bubbler device disclosed herein can be verified by monitoring voltage and/or resistivity in an electrical circuit within the bubbler device.

Like numerals (e.g., 10, 110, 210, and so forth) among the embodiments generally designate like or corresponding elements throughout the several views of the drawing figures. Accordingly, the descriptions of the embodiments are incorporated into one another, and description of subject matter common to the embodiments generally may not be repeated.

Figure 1B:
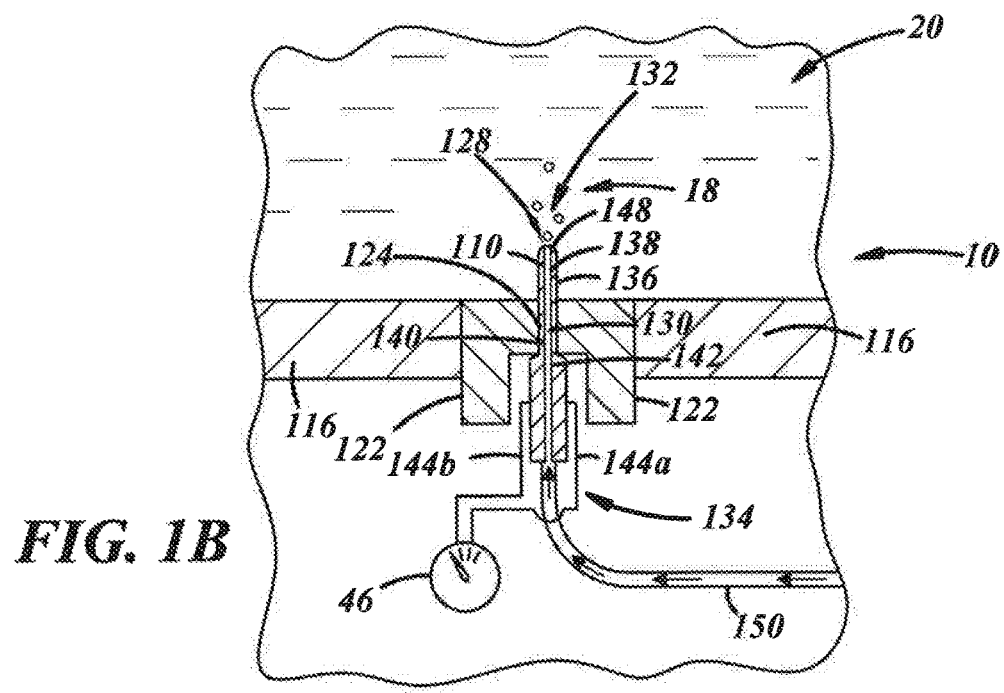
FIG. 1B is a schematic cross-sectional view of a glass manufacturing furnace having a bubbler device that extends through a floor of the furnace in accordance with an illustrative embodiment of the present disclosure.

FIGS. 1A and 1B illustrate a bubbler device 10 inserted into a furnace 12, where integrity of the bubbler device 10 is verifiable. The furnace 12 can include side walls (e.g., side wall 14) and a floor 16, which may both at least partially comprise a refractory material. The furnace 12 may be at least partially filled with a molten material 20, which can include molten glass for glass manufacturing. Of course, it is within the scope of this disclosure that the molten material could be other materials, including fiberglass, metals, slag, various other chemical compositions, or the like.

The bubbler device 10 can serve to introduce bubbles 18 into the molten material 20 in order to facilitate mixing of the molten material 20, for example, to obtain a uniform temperature and/or composition, before the molten material 20 is drawn from the furnace 12, used, and/or further processed. In implementations, the bubbler device 10 can extend along a longitudinal axis and may be configured to be inserted directly through the floor 16 and/or a side wall 14 of the furnace 12. In the embodiment illustrated in FIG. 1A, the bubbler device 10 is shown as being inserted through one of the side walls 14 of the furnace 12.

In the embodiment illustrated in FIG. 1B, the bubbler device 110 is shown inserted through a refractory block 122 disposed within the floor 116 of the furnace 12. In this specific embodiment, the refractory block 122 may include a fused cast alumina silica zirconia block (AZS) or other refractory material that extends at least partially through the floor 16. It will be appreciated that the bubbler device 110 may or may not include a refractory block 122 in a variety of configurations.

The bubbler device 110 can include a bubbler tube 124, which can be a tubular and/or cylindrical shaped conduit configured to provide a gas to the molten material 20. The bubbler tube 124 may be formed from an insulating material, for example a refractory-based material, and may be resistant to high temperature and corrosion caused by the environment in the furnace 12. It will be appreciated that the bubbler tube 124 can include any known material for providing electrical insulation against the harsh environment of the furnace 12, for example ceramic, alumina, or zirconia tubes (e.g., $ZrO_2$), ring segments, and/or powder (e.g., $Al_2O_3$).

The bubbler device 110 can include a bubbler aperture 128 in the bubbler tube 124 through which bubbles 18 can enter into the molten material 20. The bubbler aperture 128 can allow gases to pass from a bore 130 and exit proximate a first end 132 of the bubbler device 110.

The longitudinally extending internal bore 130 can be formed through the bubbler tube 124 and/or electrically conductive material 138 to allow a fluid or air flow A to flow from a remote fluid supply (not shown), through the bubbler tube 124 and bubbler aperture 128, and into the molten material 20. Although it is possible to provide different fluid or air flows with different pressures through the bubbler device 110, it is not necessary, and a constant fluid flow through the bubbler device 110 may be provided during its operation.

In an exemplary embodiment, the bubbler aperture 128 and/or the bore 130 may have a diameter of approximately 0.2 to 0.5 millimeters or more and that extends at least 20 millimeters into the bubbler tube. The diameter may be maintained from the first end 132 to a second end 134 of the bubbler device 110. However, it is also contemplated that the diameter may change in size or remain at least partially constant throughout the length of the bubbler 110. It will be appreciated that the bubbler aperture 128 may include various other diameters and/or configurations known to one of skill in the art.

A protective layer 136 can be disposed on an outer surface of the bubbler tube 124. The protective layer 136 can include a layer, a coating, and/or a cladding formed of a protective and conductive material (e.g., platinum (Pt), platinum-rhodium alloy (Pt—Rh), and/or other high temperature alloys) that is glass contact resistant and that can cover and/or extend over at least part of the bubbler tube 124. The protective layer 136 can also function as part of an electrical circuit for monitoring the babbler device 110.

The bubbler device 110 may include an electrically conductive material 138 (e.g., an inner protective material, a layer, a concentric tube, at least one wire, and the like) disposed on at least a portion of and/or extending within the bubbler tube 124, for example from the first end 132 to the second end 134. For example, the electrically conductive material 138 can include a layer, a coating, a sheath, and/or a tube disposed on an inner surface of the bubbler tube 124 within the bore 130. For example, the electrically conductive material 138 can include a concentric tube or layer of conductive material disposed on the inner surface of the bubbler tube 124 at least partially the length of the bore 130. The electrically conductive material 138 can comprise a protective and conductive material (e.g., platinum, platinum-rhodium alloy, or other high temperature/conductive alloys) and can function as part of the electrical circuit.

The bubbler device 110 may include at least one wire 140, 142 electrically and/or mechanically coupled to the protective layer 136 and/or the electrically conductive material 138. The at least one wire 140, 142 can form part of the electrical circuit and can extend through the bubbler tube 124 and can be electrically and/or mechanically coupled to at least one line 44a, 44b and/or a meter 46. The at least one wire 140, 142 can be formed from materials that are corrosion and failure resistant within the environment of the bubbler device 110. For example, the at least one wire 140, 142 may comprise platinum and/or a platinum alloy. It will be appreciated that the bubbler device 110 may include a variety of configurations of mechanically and/or electrically coupling the at least one wire 140, 142 to the protective layer 136. For example, more than two wires may be utilized and may be mechanically and/or electrically coupled to the protective layer 136. When more than one wire is used, the wires may be coupled in parallel.

The protective layer 136 may be mechanically and/or electrically connected to an electrically conductive material 138 and/or the wire(s) 140, 142 at at least one connection point 148, which may include a weld, a pressure fitting, and/or another mechanical connection, for example. The connection point 148 may be located at or proximate to an end (e.g., the first end 132) of the bubbler tube 124 exposed to the molten material 20, although it will be appreciated that the connection point 148 may be disposed at other locations. For example, the connection point 148 may include an embodiment where the at least one wire 140, 142 can be coupled to the electrically conductive material 138 within the bubbler tube 124 at a predetermined distance from the first end 132. The protective layer 136 can also be mechanically and/or electrically coupled to a line 44a, 44b (e.g., by a weld and/or a wire) to form part of the electrical circuit.

The material compositions of the various components can further protect the bubbler device 110 from early corrosion and failure. For example, the electrically conductive material 138, the protective layer 136, and/or the at least one wire 140, 142 may include platinum and/or a platinum alloy, which is a highly unreactive precious metal that is an electrical conductor. Various other similar materials, for example, ruthenium, rhodium, palladium, osmium, iridium, and/or alloys of these may also be used for forming the electrically conductive material 138, the protective layer 136, and/or the at least one wire 140, 142.

In some implementations, the electrically conductive material 138, the protective layer 136, and/or the at least one wire 140, 142 can include the same or similar materials. In these implementations, an electrical current may be applied to the electrically conductive material 138, the at least one wire 140, 142, and/or the protective layer 136, and an output current can be measured to determine resistivity/conductivity of the bubbler device 110 and whether the bubbler device 110 has been damaged. For example, if the measured output current indicates a higher-than-normal resistance, then it can be determined that the bubbler device 110 is failing or has failed. However, if the measured output current indicates high or normal conductivity, it can be determined that the bubbler device 110 is in good operating condition.

In some implementations, the electrically conductive material 138, the protective layer 136, and/or the at least one wire 140, 142 can comprise dissimilar aterials. When dissimilar materials are used, the electrical junction(s) of the electrically conductive material 138, the protective layer 136, and/or the at least one wire 140, 142 can act as a thermocouple and may serve to measure temperature (of the molten glass 20) in addition to resistivity/conductivity of the electrical circuit in the bubbler device 110 by measuring a temperature-dependent voltage as a result of the thermoelectric effect of the dissimilar materials.

At least one line 44a, 44b (e.g., an electrical line or wire) can connect components (e.g., electrically conductive material 138, protective layer 136, and/or wires 140, 142) of the bubbler device 110 to external components, such as various meters, monitors, readers, processors, various other electronics, or the like. For example, the at least one line 44a, 44b may electrically connect the bubbler device 110 to a meter 46 for measuring and/or recording various metrics (e.g., electrical conductivity, voltage, resistance, temperature, pressure, bubbling rate, air flow, or the like) of the furnace 12 and the molten material 20. It will be understood that electrical conductivity and resistivity are related properties of a given electrical circuit; therefore, measuring one makes it possible to determine the other and vice versa. In FIG. 1B, lines 144a, 144b are shown, which can connect the bubbler device 110 to a meter, and tubing 150 is shown configured to deliver a gas (e.g., air) to the bubbler device 110 from a gas supply (not shown).

At least one electrical circuit can be at least partially created by the electrically conductive material 138, the protective layer 136, the at least one wire 140, 142, at least one line (e.g., 44a, 44b), and/or the meter 46. The electrical circuit(s) can be utilized for detecting conductivity, resistivity, and/or temperature, in the case of a thermocouple configuration. It will be appreciated that the bubbler device 110 can include other configurations of electrical circuits for measuring resistivity, conductivity, and/or temperature, and/or other configurations of thermocouples.

Figure 2A:
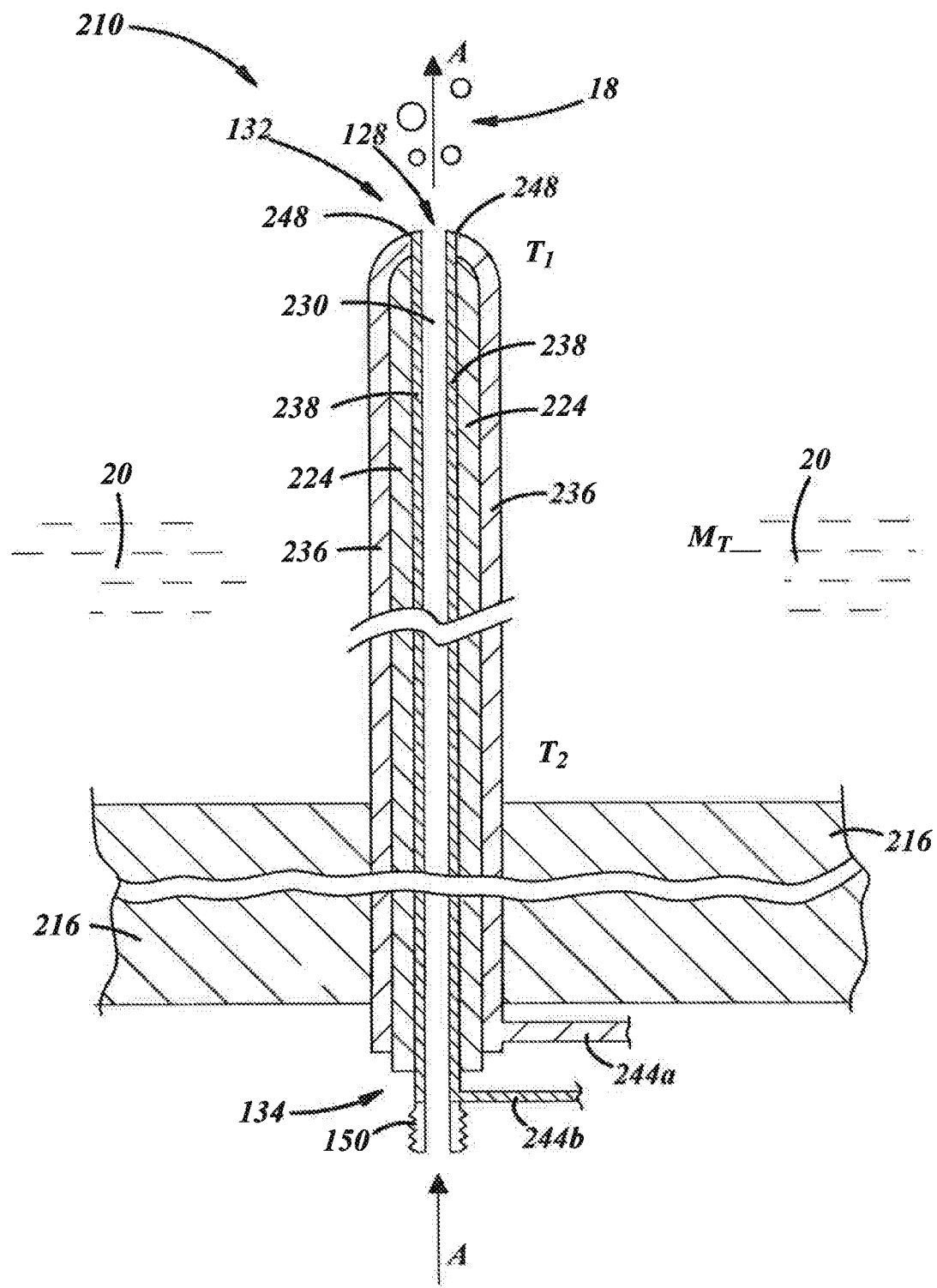
FIG. 2A is a schematic cross-sectional view of an embodiment of a bubbler tube used in the bubbler devices illustrated in FIGS. 1A and 1B, where the bubbler tube includes an inner protective material disposed inside the tube and is shown inserted through the floor of the furnace.

FIG. 2A illustrates an embodiment of the bubbler device 210 configured to be inserted through the floor 216 and/or the refractory block 122. In this embodiment, a protective layer 236 is disposed on the bubbler tube 224, which can be formed from corrosion resistant and glass contact materials (e.g., ceramic, a refractory, and the like). An electrically conductive material 238 is shown disposed within the bubbler tube 224 and/or the bore 230 and structurally and electrically coupled to the protective layer 236 at connection point 248. The electrically conductive material 238 may comprise, for example, a coating, a layer, a cylindrical and/or a smaller diameter tube, a sheath, and/or a wire formed of conductive and corrosion resistant material (e.g., platinum (Pt), platinum-rhodium alloy (Pt—Rh), gold (Au), molybdenum (Mo), and/or other high temperature alloy). In the embodiment shown in FIG. 2A, the electrically conductive material 238 can at least partially extend from a first end 132 to a second end 134 of the bubbler tube 224 and may be in the form of a coating and/or a layer of material, for example. In the embodiment shown in FIG. 2A, the electrical circuit can comprise a first line 244a shown coupled to the protective layer 236 and the meter, the protective layer 236 coupled to the electrically conductive material 238, and the electrically conductive material 238 coupled to a second line 244b, which is also coupled to the meter.

Figure 2B:
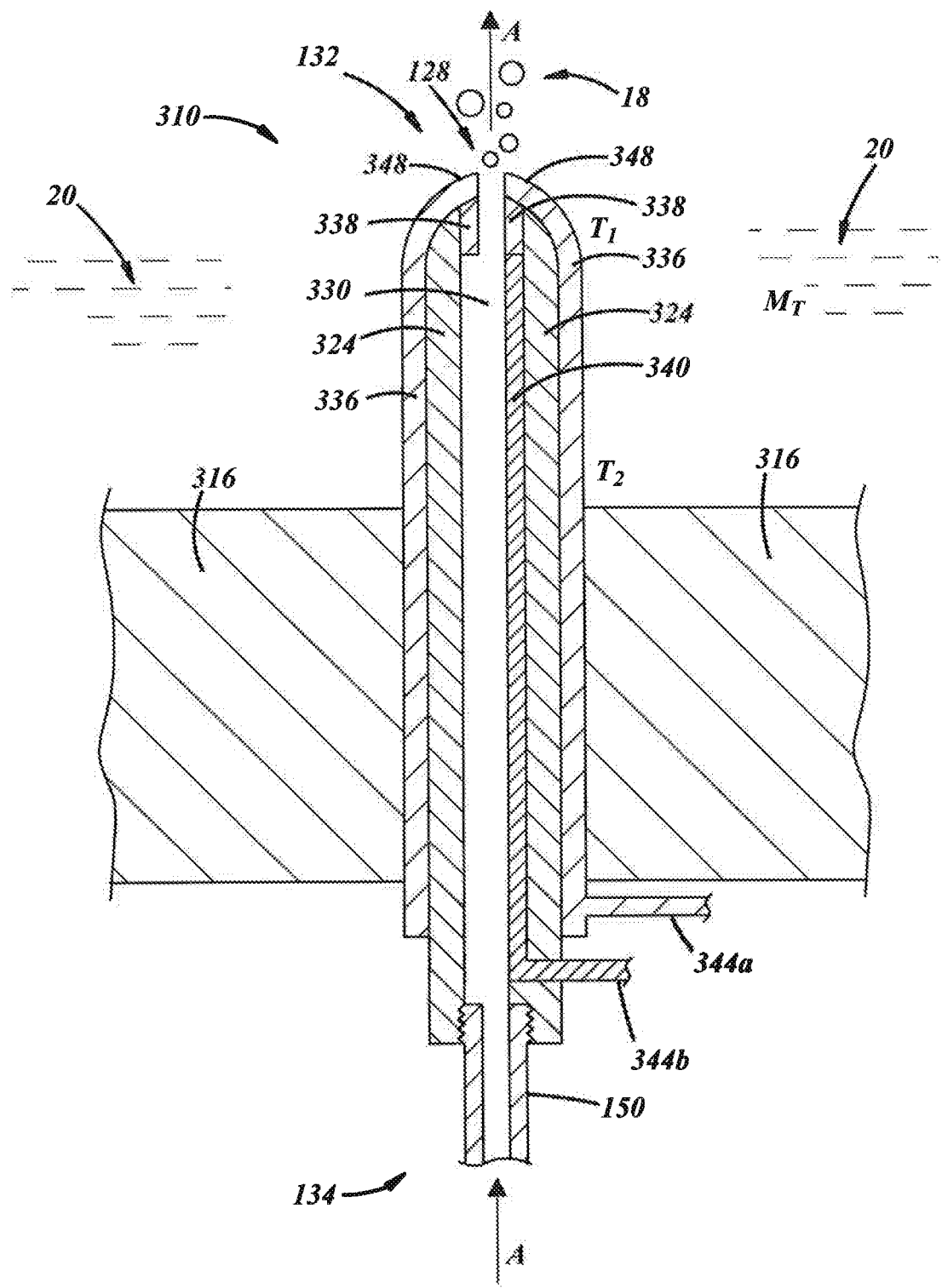
FIG. 2B is a schematic cross-sectional view of an embodiment of a bubbler tube used in the bubbler devices illustrated in FIGS. 1A and 1B, where the bubbler tube includes a wire coupled to the inner protective material and is shown inserted through the floor of the furnace.

FIG. 2B illustrates an embodiment of a bubbler device 310 extending through floor 316 and including a bubbler tube 324 and a protective layer 336 disposed on the bubbler tube 324. In this embodiment, the protective layer 336 can substantially coat and extend over an outside surface of the bubbler tube 324. FIG. 2B illustrates an electrically conductive material 338 (e.g., a tube, a sheath, a coating, and the like) that covers and extends down a portion of the bore 330 and/or the inner surface of the bubbler tube 324 for protection from molten material 20, which may inadvertently enter the bubbler tube 324. In one specific example, the electrically conductive material 338 may extend into the bubbler tube 324 approximately ½ inches, however, it is contemplated that the electrically conductive material 338 may extend into the inside of the tube a variety of lengths (e.g., ¼ inches, ¾ inches, 1 inch, and so forth).

Additionally, in FIG. 2B, the electrically conductive material 338 is shown coupled (e.g., welded) to the protective layer 336 at a connection point 348 proximate to the first end 132 of the bubbler tube 324. FIG. 2B also shows a wire 340 coupled to the electrically conductive material 338 and extending into the bubbler tube 324, where the wire 340 can ultimately be coupled to a line 344b and a meter (not shown in FIG. 2B). In the embodiment shown, one wire 340 can be coupled (e.g., welded) to the electrically conductive material 338 at a location distal from the second end 134, although it will be appreciated that one or more wires may be coupled to other various locations of the electrically conductive material 338. Additionally, in this embodiment, the protective layer 336 can be also electrically coupled to the meter, for example by a line 344a. In this embodiment, the electrical circuit can comprise the first line 344a coupled to the protective layer 336, the protective layer 336 coupled to the electrically conductive material 338 at connection point 348, the electrically conductive material 338 coupled to the wire 340, and the wire 340 coupled to the second line 344b, where the first line 344a and the second line 344b can be coupled to the meter to complete the electrical circuit. In this embodiment, only wire 340 is shown. However, it will be appreciated that multiple wires may be implemented.

Figure 2C:
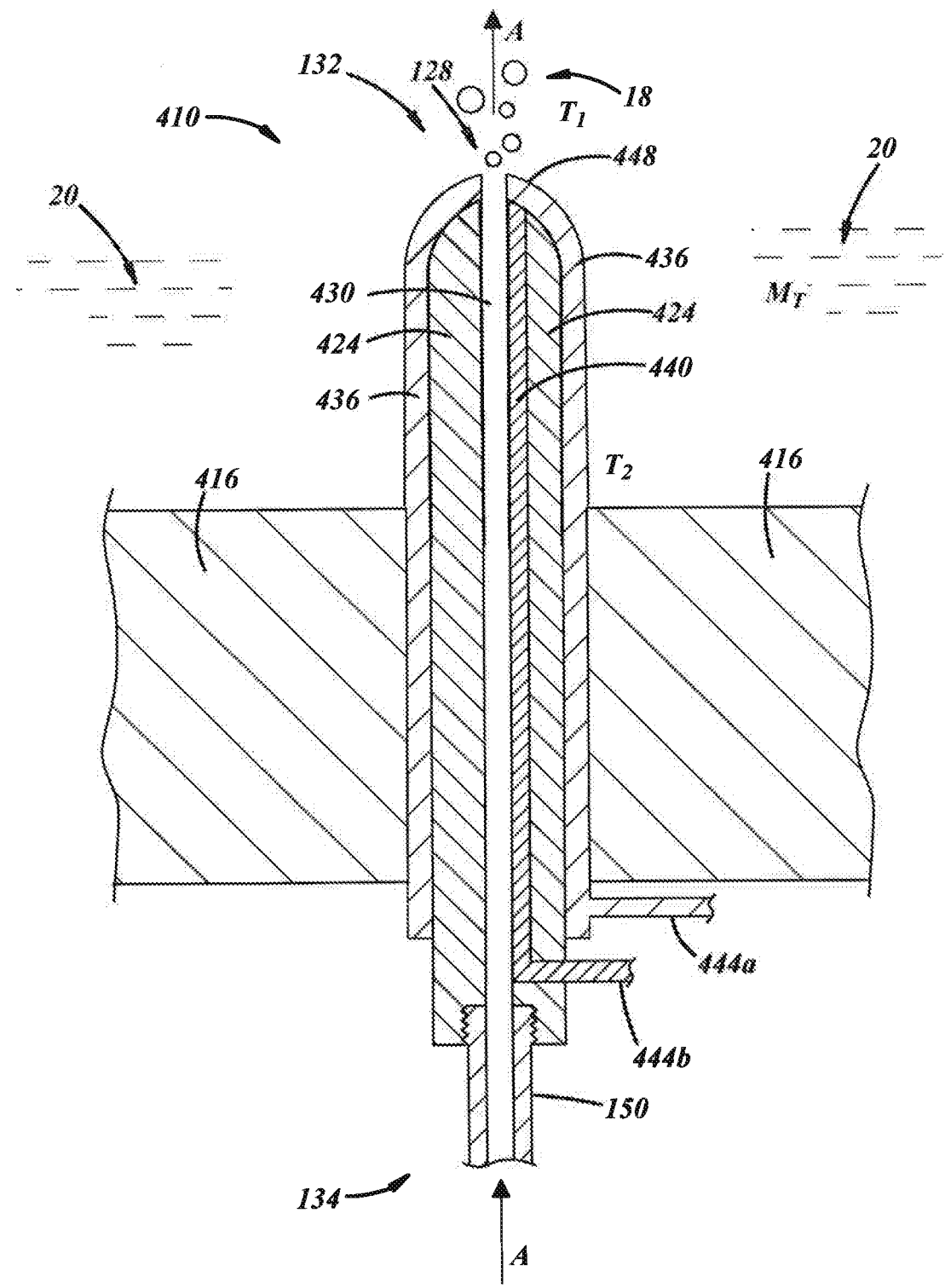
FIG. 2C is a schematic cross-sectional view of an embodiment of a bubbler tube used in the bubbler devices illustrated in FIGS. 1A and 1B, where the bubbler tube includes a wire coupled to the protective layer and is shown inserted through the floor of the furnace.

FIG. 2C illustrates an embodiment of the bubbler device 410 extending through floor 416 that includes the bubbler tube 424, the protective layer 436 disposed on the bubbler tube 424, and the wire 440 coupled directly to the protective layer 436 at connection point 448, where the connection point 448 is disposed at and/or proximate to the first end 132 of the bubbler tube 424. The wire 440 can extend from the connection point 448 into and through at least a portion of the bubbler tube 424 and/or bore 430 and can ultimately be coupled to at least one line (e.g., 444b) and/or the meter (not shown in FIG. 2C). The wire 440 may be formed of a material that is the same or different from the protective layer 436. In instances where the wire 440 is a different material than the protective layer 436, the electrical junction of wire 440 and protective layer 436 can function as a thermocouple and can provide an indication of temperature $M_T$ of the molten material 20 proximate to the connection point 448. In this example, the electrical circuit can include the first line 444a shown coupled to the protective layer 436, the protective layer 436 shown coupled to the wire 440 at connection point 448, and the wire 440 extending through the bore 430 and coupled to the second line 444b, where the first line 444a and the second line 444b can be coupled to a meter to complete the electrical circuit.

Figure 2D:
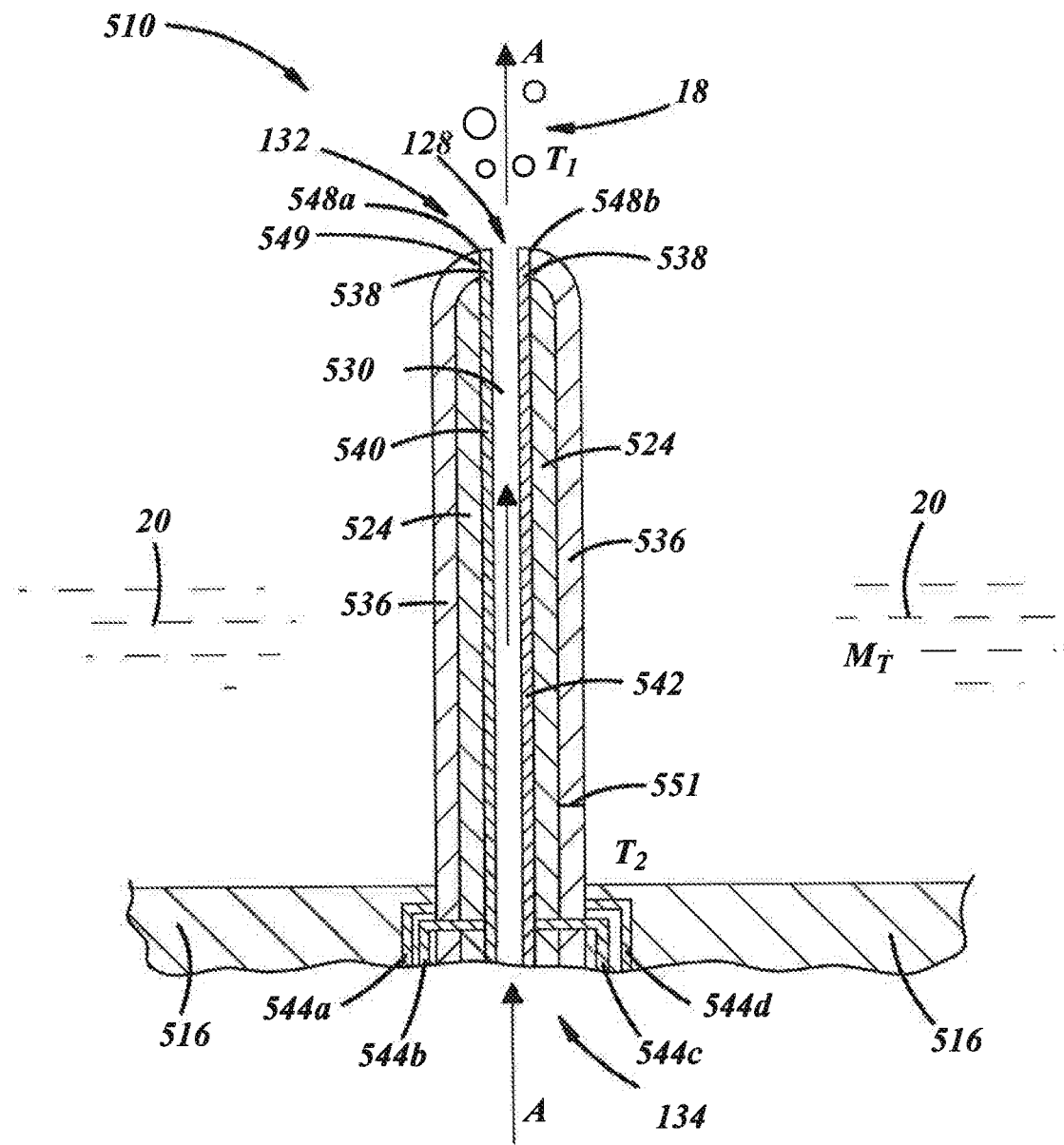
FIG. 2D is a schematic cross-sectional view of an embodiment of a bubbler tube used in the bubbler devices illustrated in FIGS. 1A and 1B, where the bubbler tube includes multiple wires coupled to the protective layer and is shown inserted through the floor of the furnace.

In the embodiment illustrated in FIG. 2D, the bubbler device 510 is shown extending through floor 516 and can include the bubbler tube 524, the protective layer 536 disposed on an outer surface of the bubbler tube 524, a first wire 540, and a second wire 542, where the first wire 540 and the second wire 542 are shown coupled to the electrically conductive material 538 at connection points 548a, 548b, respectively, and where the connection points 548a, 548b are disposed at and/or proximate to the first end 132 of the bubbler tube 524. It is contemplated that connection points 548a, 548b may be disposed at other locations other than proximate to the first end 132. Additionally, in some cases, the protective layer 536 may be electrically partitioned so that separate electrical circuits may be formed. The wires 540, 542 can extend from the connection points 548a, 548b into and through at least a portion of the bubbler tube 524 and/or the bore 530 and can ultimately be coupled to at least one line 544a, 544b, 544c, 544d and/or the meter (not shown in FIG. 2D). The wires 540, 542 may be formed of a material that is the same or different from each other and/or the protective layer 536. In instances where the wires 540, 542 are a different material than the protective layer 536, the wires 540, 542 and the protective layer 536 can function as at least one thermocouple and can provide an indication of temperature of the molten material 20 proximate to the connection points 548a, 548b. In some instances, the wires 540, 542 and the protective layer 536 may all be different materials.

In the example illustrated in FIG. 2D, the electrical circuit can include the first line 544a coupled to the protective layer 536, the protective layer 536 coupled to the electrically conductive material 538 at connection point 548a, the electrically conductive material 538 coupled to the first wire 540, and the first wire 540 coupled to the second line 544b, where the first line 544a and the second line 544b can be coupled to the meter to complete a first electrical circuit. Additionally, in this example, when the protective layer 536 is partitioned (electrically and structurally), a second electrical circuit can include a third line 544c coupled to a second wire 542, the second wire 542 coupled to the electrically conductive material 538, the electrically conductive material 538 coupled to the protective layer 536 at connection point 548b, and the protective layer 536 coupled to a fourth line 544d, where the third line 544c and the fourth line 544d can be coupled to the meter to form the second electrical circuit. In this example, the first electrical circuit and the second electrical circuit can each form a thermocouple, where each thermocouple can determine a temperature at different locations within the bubbler 510 device (e.g., a first temperature at a first end 132, a second temperature at a second end 134, and so forth).

When the bubbler device 110 is operating normally (e.g., the electrical circuit is closed, as illustrated in the bubbler devices 10, 110, 210, 310, 410, 510 in FIGS. 1B through 2D), the electrical current in the electrical circuit(s) can indicate high electrical conductivity/low electrical resistivity and thus high integrity and working condition of the bubbler device 10.

Figure 2E:
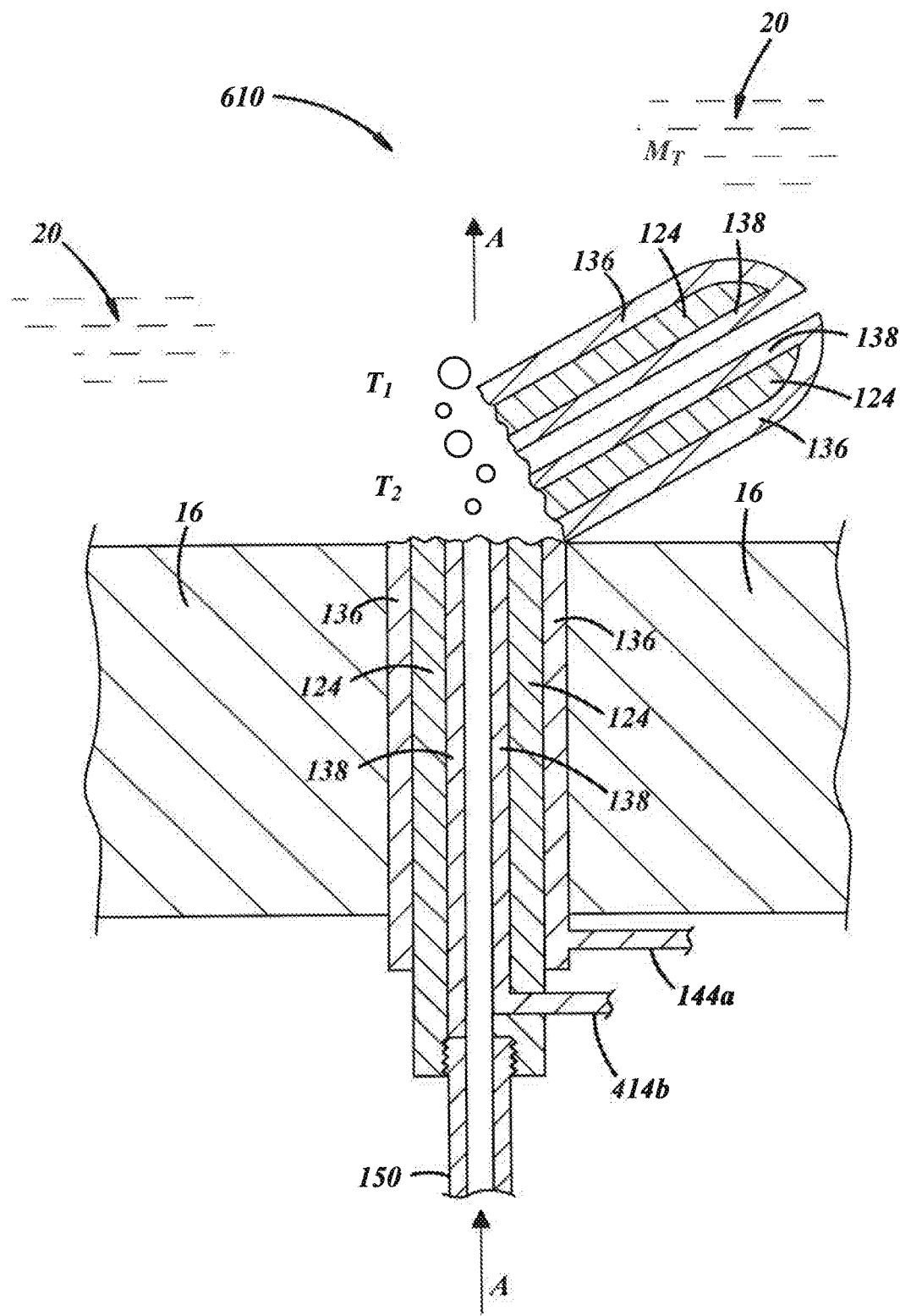
FIG. 2E is a schematic cross-sectional view of an embodiment of the bubbler tube used in the bubbler devices illustrated in FIGS. 1A and 2D, where the bubbler tube is damaged resulting in a change in electrical conductivity and/or resistivity.

Over time, various components of the bubbler device 610 can at least partially fail, for example, the molten material 20 may corrode the bubbler device 610 or components of the bubbler device 610, as illustrated by the broken bubbler device 610 in FIG. 2E. When this failure happens, at least one electrical circuit is open or diminished and the electrical current in the electrical circuit will indicate a decrease in or absence of electrical conductivity of the electrical circuit, indicate an increase in electrical resistivity, and/or indicate integrity/failure of the bubbler device 610. The bubbler device 610 is illustrated as completely or nearly completely failed or broken. However, change in the electrical circuit(s) within the bubbler device 610 may also indicate partial failure due to corrosion or other component malfunction indicated by reduced conductivity and/or increased resistance.

In a specific example, the resistivity of platinum at 1200° C. can be about 42 μohms cm, where at the same temperature, the resistivity of glass can be about 0.89 ohms·cm. For a meter-long path using an approximately 1 mm diameter wire (e.g., wire 140), the resistivity of the wire can be about 0.4 ohms. However, if the wire is broken, corroded, or otherwise damaged, the resistivity of the wire 140 may increase above 1 ohm, which may indicate failure or potential failure of the bubbler device 110. When measurement of the electrical current within the bubbler device 110 indicates a low electrical conductivity/high electrical resistivity, the bubbler device 110 will likely need maintenance and/or replacement. In this way, the electrical circuit allows monitoring of the integrity and functionality of the bubbler device 110.

In some instances, the electrical circuit and voltage output of the bubbler device 110 may serve to monitor and/or measure a material temperature $M_T$ of the molten material 20. When the protective layer 136 and the electrically conductive material 138 and/or the wire(s) 140, 142 comprise different materials, the bubbler device 110 can function as a thermocouple for determining the material temperature $M_T$. For example, an S-type thermocouple may be used herein, where the electrically conductive material 138 and/or wire(s) 140, 142 may comprise 90% platinum (Pt) and 10% rhodium (Rh) by weight, and the protective layer 136 may comprise 100% Pt. The connection point 148 (electrical junction) can include the measurement point of the material temperature $M_T$ and may be disposed at the inserted tip (e.g., first end 132) of the bubbler tube 124 or at other suitable locations.

Correspondingly, a first connection (e.g., a first electrical junction) within the thermocouple may have a different and/or higher temperature than a second connection (e.g., a second electrical junction) within the thermocouple, for example, because the first connection may be farther away from a wall (e.g., side wall 14, floor 16) of the furnace 12 than the second connection. For example, the first connection may be disposed proximate to the first end 132 of the bubbler tube 124, and the second connection may be disposed proximate to the floor 16 and/or the second end 134. Thus, there may be a temperature differential $\Delta T$ between the first and second connections. By placing the connections at locations having different temperatures, a thermocouple can be created to measure the temperature differential $\Delta T$ between the first and second connections. The temperature differential $\Delta T$ may be sent as data to the remote electronics (e.g., meter 46).

Not only can the thermocouple monitor the temperature differential $\Delta T$, but it may also indicate a bubbling rate of the bubbler device 110. For example and as shown in FIG. 2D, by measuring the temperature at a first electrical junction 549 proximate the first end 132 and at a second electrical junction 551 located distant from the first end 132 on the bubbler tube (i.e., closer to the floor 16 of the furnace 12 but inside the furnace 12 within the molten material 20) and the change in these two temperature measurements as fluid moves through the bubbler tube 124, it is possible to determine how fast the fluid is moving through the bubbler tube 124, which indicates the bubbling rate. Also, by knowing these temperatures and the temperature changes at these locations, it is possible to determine the direction that the molten material 20 is flowing based on the bubbling rate. For example, if the temperature at/proximate the first electrical junction 549 is cooler than the temperature at/proximate the second electrical junction 551, this is an indication that the bubbling action has caused cooler molten material 20 from near the floor 16 of the furnace 12 to flow upward toward the first electrical junction 549 and/or the first end 132 of the bubbler tube 124. Additionally, it may be possible to adjust the flow and velocity of the molten material 20 by setting or adjusting the bubbling rate based on the determined current bubbling rate, temperature differential $\Delta T$, and the temperatures at the two junction locations. This can be done, for example, by controlling the gas fluid flow rate through the bubbler tube 124.

The determined bubbling rate may also indicate the integrity of the bubbler device 110. When the bubbler device 110 begins to fail, the temperature differential $\Delta T$ between the second end 134 and the first end 132 may be indicated as lower (e.g., the two temperatures $T_1$ and $T_2$ are closer than normal) and/or more sporadic than normal because of a lack of molten material flow due to a low bubbling rate and/or lack of bubbles produced by the bubbler device 110. By measuring the temperature differential $\Delta T$ and/or determining the bubbling rate, the integrity of the bubbler device 110 can be monitored.

A method of operating the bubbler device 110 can include a step of monitoring the electrical conductivity and/or resistivity of the electrical circuit of the bubbler device 110 using at least the electrically conductive material 138, wires 140, 142, and/or the protective layer 136 having any or all of the features described herein. Monitoring the electrical circuit can be performed by, for example, meter 46 and/or a controller or processor (not shown). Once the electrical conductivity or resistivity of the electrical circuit is monitored/determined, the method can further include sending a first signal $S_1$, for example with the assistance of the meter 46 to a display and/or a controller, when a change in the electrical conductivity or resistivity from normal levels of the electrical circuit is detected. Sending the first signal $S_1$ can include a first signal $S_1$ that causes an alarm or alert in the remote electronics (e.g., a controller, a display, and the like) to provide an alert of change in the electrical conductivity or resistivity of the electrical circuit.

The method may also include monitoring the material temperature $M_T$ of the molten material 20 around the bubbler device 110 with the thermocouple of the bubbler device 110 and/or monitoring the bubbling rate of the bubbler device 110. These monitoring steps can both include monitoring the first temperature $T_1$ of the molten material 20 proximate the first end 132 of the bubbler device 110, monitoring the second temperature $T_2$ of the molten material 20 proximate the second end 134 of the bubbler device 110, and determining the temperature differential $\Delta T$ between the first and second temperatures $T_1$, $T_2$ to determine the bubbling rate. Once the bubbling rate is determined, the method can include sending a second signal $S_2$, for example to a controller and/or a display, when there is a change in the bubbling rate of the bubbler 110, which second signal $S_2$ can include an indication of the bubbling rate and can cause an alarm or alert as described with the first signal $S_1$.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A bubbler device comprising:
   a bubbler tube including an internal bore that provides bubbles to a molten material in a furnace;
   a protective layer disposed on an outside surface of the bubbler tube; and
   an electrically conductive material that is electrically coupled to the protective layer, wherein the electrically conductive material extends through at least a portion of the bore, and wherein the protective layer and the electrically conductive material at least partially form a first electrical circuit for measuring an integrity of the bubbler device based on at least one of a conductivity or a resistance in the electrical circuit or a temperature of the molten material.

2. The bubbler device of claim 1, wherein the molten material is glass.

3. The bubbler device of claim 1, wherein the electrically conductive material is structurally coupled to the protective layer.

4. The bubbler device of claim 1, wherein the protective layer comprises at least one of platinum or platinum-rhodium alloy.

5. The bubbler device of claim 1, wherein the bubbler tube is formed of an insulating material.

6. The bubbler device of claim 1, wherein the bubbler tube includes a bubbling aperture that extends at least 20 millimeters into the bubbler tube.

7. The bubbler device of claim 1, further comprising a meter electrically connected to the electrically conductive material and the protective layer.

8. The bubbler device of claim 1, wherein the electrically conductive material includes at least one of a wire, a concentric tube, a sheath, a coating, or a layer.

9. The bubbler device of claim 1, wherein the electrically conductive material extends concentrically within the bubbler tube.

10. The bubbler device of claim 1, wherein the electrically conductive material is structurally and electrically coupled to the protective layer and at least one wire, wherein the at least one wire extends at least partially through the bubbler tube, and wherein the protective layer, the electrically conductive material, and the at least one wire form a portion of a second electrical circuit.

11. The bubbler device of claim 1, wherein the electrically conductive material comprises at least one of platinum, platinum-rhodium alloy, gold, or molybdenum.

12. The bubbler device of claim 1, wherein the electrically conductive material only partially extends into the bubbler tube.

13. The bubbler device of claim 1, wherein the bubbler device is configured to be inserted into the furnace.

14. The bubbler device of claim 13, wherein the bubbler device is configured to be inserted into a refractory block in a floor of the furnace.

15. The bubbler device of claim 1, wherein the protective layer and the electrically conductive material are different materials.

16. The bubbler device of claim 15, wherein an electrical junction between the protective layer and the electrically conductive material forms a thermocouple.

17. The bubbler device of claim 15, wherein a first electrical junction is proximate to a first end of the bubbler device and is configured to indicate a first temperature, and a second electrical junction is nearer to a floor of the furnace than the first electrical junction and is configured to indicate a second temperature, wherein a difference between the first temperature and the second temperature determines at least one of a bubbling rate or a direction that the molten material flows.

18. A method of operating a bubbler device, the method comprising:
monitoring an electrical conductivity or a resistivity of at least one electrical circuit of the bubbler device, the bubbler device comprising:
a bubbler tube including an internal bore that provides bubbles to a molten material in a furnace;
a protective layer disposed on an outside surface of the bubbler tube; and
an electrically conductive material that is electrically coupled to the protective layer, wherein the electrically conductive material extends through at least a portion of the bore, and wherein the protective layer and the electrically conductive material at least partially form at least one electrical circuit for monitoring an integrity of the bubbler device based on at least one of a conductivity and a resistivity in the at least one electrical circuit, or a temperature of the molten material.

19. The method of claim 18, further comprising monitoring a temperature of the molten material around the bubbler device using the protective layer formed from a first material and the electrically conductive material formed from a second material that is different than the first material, where the protective layer and the electrically conductive material form a thermocouple.

20. The method of claim 18, further comprising sending a first signal when there is a change in the electrical conductivity or resistivity of the electrical circuit.

21. The method of claim 19, further comprising sending a second signal when there is a change in the bubbling rate of the bubbler device.

* * * * *